T868010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 730

835,295

BASIC-DYEABLE POLYESTERS CONTAINING AN ALKALI METAL SALT OF A SULFODIPHENYL-ETHER DICARBOXYLIC ACID OR ITS ESTER

Gerald Ray Lappin, James Cuthbert Martin, and Ronald Hugh Meen, all of P.O. Box 511, Kingsport, Tenn. 37662

Continuation of application Ser. No. 671,565, Sept. 29, 1967. This application June 11, 1969. Published Nov. 18, 1969

Int. Cl. C08g *17/08*

U.S. Cl. 260—49

No Drawing. 22 Pages Specification

Linear, high molecular weight polyesters, such as poly(ethylene terephthalate) and poly(1,4-cyclohexylenedimethylene terephthalate), are rendered dyeable with basic dyes by incorporating in the polymer chain of said polyesters the residue of a new organic compound which is an alkali metal salt of a sulfodiphenyl ether dicarboxylic acid or its ester.